United States Patent
Batho et al.

(10) Patent No.: US 9,214,816 B2
(45) Date of Patent: Dec. 15, 2015

(54) SYSTEM AND METHOD FOR SUBSEA POWER DISTRIBUTION NETWORK

(75) Inventors: Peter Batho, Houston, TX (US); Jan Elde, Fyllingsdalen (NO); Audun Magne Askeland, Bergen (NO); Jean-Luc Monnac, Chavenay (FR); Dinesh R. Patel, Sugar Land, TX (US)

(73) Assignee: FRAMO ENGINEERING AS, Bergen (NO)

( * ) Notice: Subject to any disclaimer, the term of this patent is extended or adjusted under 35 U.S.C. 154(b) by 70 days.

(21) Appl. No.: 13/083,149

(22) Filed: Apr. 8, 2011

(65) Prior Publication Data

US 2011/0247825 A1      Oct. 13, 2011

Related U.S. Application Data

(60) Provisional application No. 61/322,199, filed on Apr. 8, 2010.

(51) Int. Cl.
| | |
|---|---|
| *E21B 41/00* | (2006.01) |
| *E21B 43/01* | (2006.01) |
| *H02J 5/00* | (2006.01) |

(52) U.S. Cl.
CPC .............. *H02J 5/00* (2013.01); *E21B 41/0007* (2013.01); *Y10T 307/297* (2015.04)

(58) Field of Classification Search
USPC .......... 166/351, 352, 368, 369, 65.1, 68, 105; 340/853.1
See application file for complete search history.

(56) References Cited

U.S. PATENT DOCUMENTS

| | | | | |
|---|---|---|---|---|
| 4,309,734 | A * | 1/1982 | Warren ........................... | 361/58 |
| 5,025,865 | A * | 6/1991 | Caldwell et al. .............. | 166/366 |
| 5,490,121 | A * | 2/1996 | Gardner et al. ................. | 367/83 |
| 5,587,707 | A * | 12/1996 | Dickie et al. ............. | 340/870.09 |
| 6,469,636 | B1 * | 10/2002 | Baird et al. ................. | 340/854.9 |
| 7,011,152 | B2 * | 3/2006 | Soelvik ......................... | 166/65.1 |
| 7,836,973 | B2 * | 11/2010 | Belcher et al. ................... | 175/25 |
| 7,931,090 | B2 * | 4/2011 | Smedstad et al. ............. | 166/366 |
| 2002/0040783 | A1 | 4/2002 | Zimmerman | |
| 2003/0010492 | A1 * | 1/2003 | Hill et al. ..................... | 166/65.1 |
| 2003/0010493 | A1 * | 1/2003 | Hill et al. ..................... | 166/65.1 |

(Continued)

FOREIGN PATENT DOCUMENTS

WO      2007071266 A1      6/2007

OTHER PUBLICATIONS

International Search Report and Written Opinion of the International Searching Authority dated Dec. 20, 2011 for corresponding application No. PCT/US2011/031816 filed Apr. 8, 2011.

*Primary Examiner* — Matthew Buck
*Assistant Examiner* — Aaron Lembo
(74) *Attorney, Agent, or Firm* — Sonley Rose, P.C.

(57) ABSTRACT

An integrated power distribution system utilizes a subsea power distribution hub that receives high voltage electricity through an umbilical from a host surface facility. The subsea power distribution hub steps down the high voltage electricity and distributes the appropriate electrical power supply to multiple components of a subsea production system (e.g., in-well pumps, subsea booster pumps, subsea processing units, subsea valves, and subsea sensors) via jumpers. The integrated subsea power distribution system can be utilize to supply electrical power to all of the required process components of the subsea production system from the in-well completion to the surface host facility.

21 Claims, 3 Drawing Sheets

(56) References Cited

U.S. PATENT DOCUMENTS

| | | | |
|---|---|---|---|
| 2003/0183393 A1* | 10/2003 | Fincher et al. | 166/367 |
| 2004/0011523 A1* | 1/2004 | Sarada | 166/244.1 |
| 2005/0029476 A1* | 2/2005 | Biester et al. | 251/58 |
| 2007/0107907 A1 | 5/2007 | Smedstad et al. | |
| 2009/0009931 A1* | 1/2009 | Rocke | 361/602 |
| 2009/0120632 A1* | 5/2009 | Worman et al. | 166/65.1 |
| 2010/0019573 A1* | 1/2010 | Biester et al. | 307/12 |
| 2010/0147510 A1* | 6/2010 | Kwok et al. | 166/250.01 |

\* cited by examiner

SYSTEM AND METHOD FOR SUBSEA POWER DISTRIBUTION NETWORK

RELATED APPLICATIONS

This application claims the benefit of U.S. Provisional Patent Application No. 61/322,199 filed on 8 Apr. 2010.

BACKGROUND

This section provides background information to facilitate a better understanding of the various aspects of the invention. It should be understood that the statements in this section of this document are to be read in this light, and not as admissions of prior art.

The invention relates generally to devices and methods for supplying electrical power to subsea production installations and more specifically to a subsea integrated power network to facilitate power distribution to and control functions of a subsea production system.

Electrical power is necessary for operating various components (e.g., devices and systems) associated with subsea production systems. For example, production wells often require electricity to operate sensors located in the well and/or at the wellhead, electric submersible pumps ("ESP") disposed in wells, and valves and/or actuators located in the wells and flow lines. Electrical power is also necessary to operate booster pumps, or compressors, that are utilized to pump production fluid (e.g., oil, water, and/or gas) from the wells or subsea processing systems to a distal surface facility located at the water surface or on-land. The high electrical power requirements, harsh environmental conditions and often long distances across which the power must be limited often limits the amount of power that can be efficiently delivered.

SUMMARY

According to one or more aspects of the invention a subsea production system comprises a surface host facility comprising a surface electrical power source; a subsea power distribution hub operationally connected to the surface electrical power source to receive a high voltage input, wherein the subsea power distribution hub includes a transformer to provide a medium voltage output and a low voltage output; an in-well pump disposed in a subsea well, the in-well pump connected to one of the voltage outputs of the subsea power distribution hub; and a seafloor booster pump connected to one of the voltage outputs of the subsea power distribution hub.

An embodiment of a method for providing electrical power to a subsea production system comprises supplying a high voltage input from a surface host facility to a subsea power distribution hub located proximate to a seafloor; stepping down the high voltage input at the subsea power distribution hub to a medium voltage output and a low voltage output; supplying the medium voltage output to two or more medium voltage devices of a subsea production system; and supplying the low voltage output to one or more low voltage devices of the subsea production system.

According to one or more embodiments of the invention, integrated power distribution network devices for a subsea production system comprise a subsea power distribution hub adapted to connect to a surface host facility to receive a high voltage input and to step down the high voltage input to a medium voltage output and a low voltage output; an umbilical adapted to operationally connect the subsea power distribution system to the surface host facility, the umbilical comprising an electrical conductor to transmit the high voltage input and a data conductor to transmit output data from the surface host facility to the subsea distribution hub and input data from the subsea power distribution hub to the surface host facility; a jumper adapted to operationally connect an in-well pump to the medium voltage output; a jumper adapted to operationally connect a seafloor booster pump to the medium voltage output; and a jumper adapted to operationally connect a sensor disposed in a subsea well to the low voltage output.

The foregoing has outlined some of the features and technical advantages of the invention in order that the detailed description of the invention that follows may be better understood. Additional features and advantages of the invention will be described hereinafter which form the subject of the claims of the invention.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
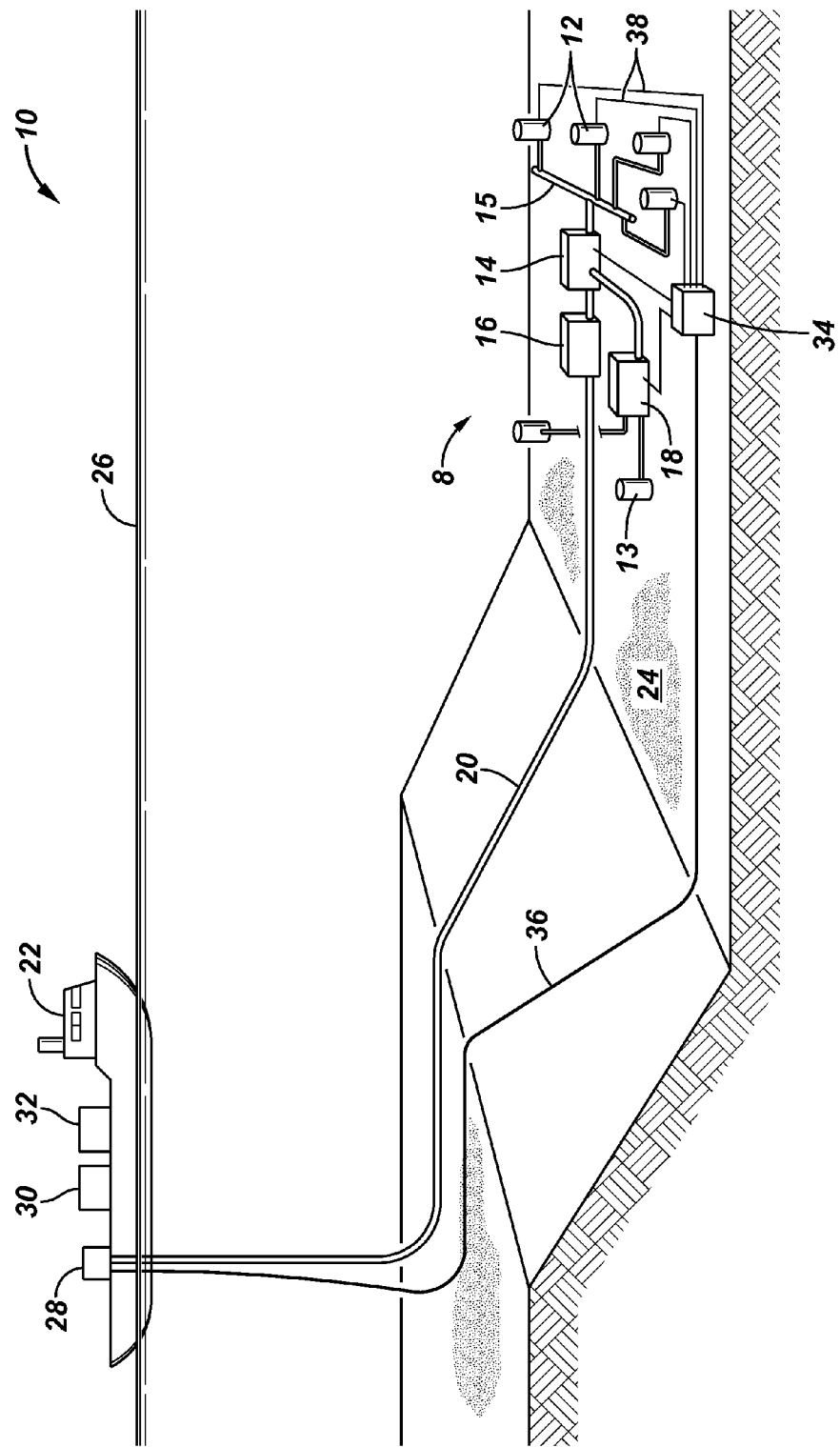
FIG. 1 is a schematic illustration of an embodiment of an integrated electrical power distribution system for a subsea production system according to one or more aspects of the invention.

It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

FIG. 1 is a schematic illustration of an embodiment of an integrated electrical power distribution network for a subsea production system according to one or more aspects of the invention. The depicted subsea production system, generally denoted by the numeral 8, includes subsea production wells 12, production gathering manifold 15, injection wells 13, processing unit(s) 14 (e.g., separators, coalescers, etc.), booster pump(s) 16, and injection pumps 18. Wells 12 and 13 are drilled into the subterranean formations below seafloor 24. Each of the completed wells 12 and 13 typically includes one or more sensors (e.g., gauges), instrumentation, and surface (e.g., wellhead, tree) valves. Wells 12 and 13 may also include subsurface valves and in-well pumps (e.g., electric submersible pumps). Production wells 12 are in fluid communication with surface host facility 22 through flow line(s) 20. In the depicted embodiment, flow line 20 is connected to surface host facility 22 at boarding valve 28. Booster pumps 16 are typically in fluid connection with production wells 12 (e.g., in-well pumps 56) to provide additional head to pump the produced fluid from well 12 to surface host facility 22.

Surface host facility 22 is located at a surface location 26 (e.g., land, water surface) which may be located an extended distance (e.g., step-out distance) from the seafloor 24 location of the production facility components. For example, the step-out distance to the surface host facility 22 may be 10 to 150 km or more for transmission of AC electrical current and 300 km for transmission of DC electrical power. In FIG. 1, surface host facility 22 is depicted as a marine vessel (e.g., ship, tanker, platform, etc.) located at the water surface. In some embodiments, surface host facility 22 may be located on land.

The integrated electrical power distribution network, generally denoted by the numeral 10, is adapted to provide electrical power to multiple consumers within the limits of subsea production system 8. For example, the limits of subsea production system 8 can extend from the in-well completions of subsea wells 12, 13 to the boarding valve of surface host facility 22. According to at least one embodiment, electrical distribution network 10 comprises an electrical power source 30 and processor based controller 32 (e.g., programmable logic controller) located at surface host facility 22 and a power distribution hub 34 located subsea (e.g., seafloor 24) proximate to the subsea production system 8 components. Power distribution hub 34 is operationally connected to surface electrical power source 30 and surface controller 32 through umbilical 36. Umbilical 36 may include one or more conductors (e.g., wires, optic fibers, etc.) for transmitting electrical power and data between surface host facility 22 and subsea distribution hub 34. Umbilical 36 may be connected to subsea distribution hub 34, for example, by a wet mate connector. Subsea distribution hub 34 is operationally connected to the electrical consumers (e.g., subsurface and pumps, sensors, valves, actuators, heaters, etc.) by jumpers 38 (e.g., umbilical, cables, lines, conductors, optic fibers). Jumpers 38 can include electrical power conductors and/or data conductors.

Figure 2:
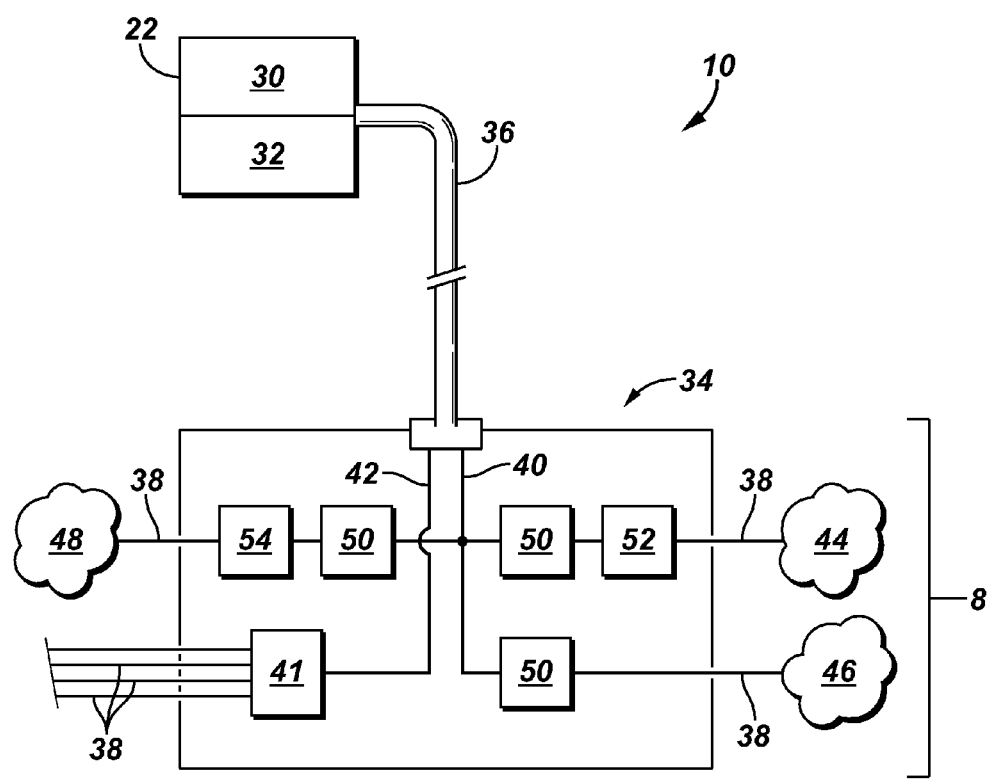
FIG. 2 is a schematic illustration of subsea power distribution hub according to one or more aspects of the invention.

FIG. 2 is a schematic illustration of a subsea power distribution hub 34 of an integrated power distribution network according to one or more aspects of the invention. Umbilical 36 connects subsea distribution hub 34 to surface electrical source 30 and surface controller 32 of surface host facility 22. In the depicted embodiment, umbilical 36 includes one or more electrical conductors 40 to transmit the electrical power from electrical source 30. For example, high voltage (e.g., greater than 22,000 VAC) may be transmitted from surface host facility 22 to subsea distribution hub 34 to minimize conductor cross section and transmission losses. According to one or more aspects of the invention, umbilical 36 comprises one or more dedicated data conductors 42 (e.g., I-wire, cable, line, optic fiber, etc.) to transmit output control data from surface controller 32 to subsea distribution hub 34 (e.g., subsea data hub 41) and then to the various electrical consumers (e.g., pumps, sensors, valves, actuators, etc.) of subsea production system 8 and to transmit input data received at subsea distribution hub 34 to surface controller 32.

In the embodiment depicted in FIG. 2, subsea distribution hub 34 includes a subsea data hub 41 adapted to receive input data collected from the subsea production system 8 components comprising production system parameters, such as well 12, 13 conditions (e.g., pressure, temperature, flow rate, sand production, fluid phase composition, scaling, etc.), seafloor pump 16, 18 parameters (e.g., pressure, temperature, electric current, flow rates, etc.), production unit 14 conditions (e.g., resonant time, pressures, temperatures, electric currents, input and output fluid phase composition, input and output flow rates, etc.), and flowline conditions (e.g., pressure, temperature, hydrate formation, flow rates, temperatures, etc.). The input data (i.e., production system parameters) is received at subsea data hub 41 from the subsea production system 8 components via jumpers 38. Input data from the various subsea production system 8 components is consolidated at subsea data hub 41 and transmitted via one or more dedicated data conductors 42 in the umbilical 36 to surface host facility 22 and surface controller 32.

Input data can be used by surface controller 32 for closed loop control of various subsea production system components, including without limitation in-well pumps (e.g., electric submersible pumps ("ESP")), seafloor pumps (e.g., booster pumps 16, injection pumps 18), and processing units 14. Surface host facility 22, i.e., controller 32, can be utilized to balance power distribution between components of subsea production system 8 for example. According to one embodiment of the invention, system 10 facilitates safe, reliable and optimized subsea production by consolidating all sensed input data from subsea production system 8 at surface controller 32. The processor based surface controller 32 may be linked to remote interactive monitoring and diagnostic systems, for example for condition monitoring of the subsea production system 8 components and/or production parameters.

According to at least one embodiment, a high voltage (e.g., over 22,000 VAC) is transmitted from host facility 22 across umbilical 36 to subsea distribution hub 34. Subsea distribution hub 34 then steps down the power and distributes the power to the various electrical consumers of subsea production system 8 through one or more circuits (e.g., outputs). For example, in the depicted embodiment, subsea distribution hub 34 provides a medium voltage output 44 (e.g., 3000-7000 VAC), low voltage output 46 (e.g., 110-700 VAC), and a DC electrical output 48.

In the depicted embodiment, components of subsea production system 8 that are categorized as medium voltage are operational connected to medium voltage output 44 circuit, e.g., transformer 50 and variable speed drive 52 (e.g., frequency converter). Examples of medium voltage devices include without limitation, pumps (e.g., in-well electric submersible pumps, booster pumps, and injection pumps), compressors, and fluid phase separation units (e.g., processor units). The variable speed drive 52 facilitates transmitting power to the in-well and seafloor pumping equipment at the required operating frequency (Hz), and facilitating selective speed variation from the surface host facility to meet the production head and flow requirements for example. Power balancing and load sharing between various production pumps, for example combinations of in-well pumps (e.g., electric submersible pumps, lift pumps) and seafloor booster pumps, can be performed via surface controller 32 of surface host facility 22. The integrated subsea power distribution network facilitates simultaneously controlling operation of multiple subsea production system 8 components from surface host facility 22.

Low voltage devices are schematically depicted operationally connected to a low voltage output 46 circuit having a transformer 50. Low voltage output 46 circuit may comprise a variable speed drive 52. Low voltage components (e.g., devices) include without limitation sensors, such as multiphase meters; electric valves and actuators that may be located for example, in-well (i.e., subsurface), at wellheads (e.g., Christmas tree, valve tree), flowlines, and gathering manifolds; local chemical injection pumps; and control and instrumentation systems. Static high electrical power users include without limitation flow line heaters and electrostatic coalescers (e.g., processing units).

DC powered devices are schematically depicted operationally connected to a DC output 48 circuit having a transformer 50 and rectifier 54. DC powered devices include without limitation sensors, such as without limitation pressure sensors, temperature sensors, flow rate meters, multi-phase meters, electrical current and the like.

Figure 3:
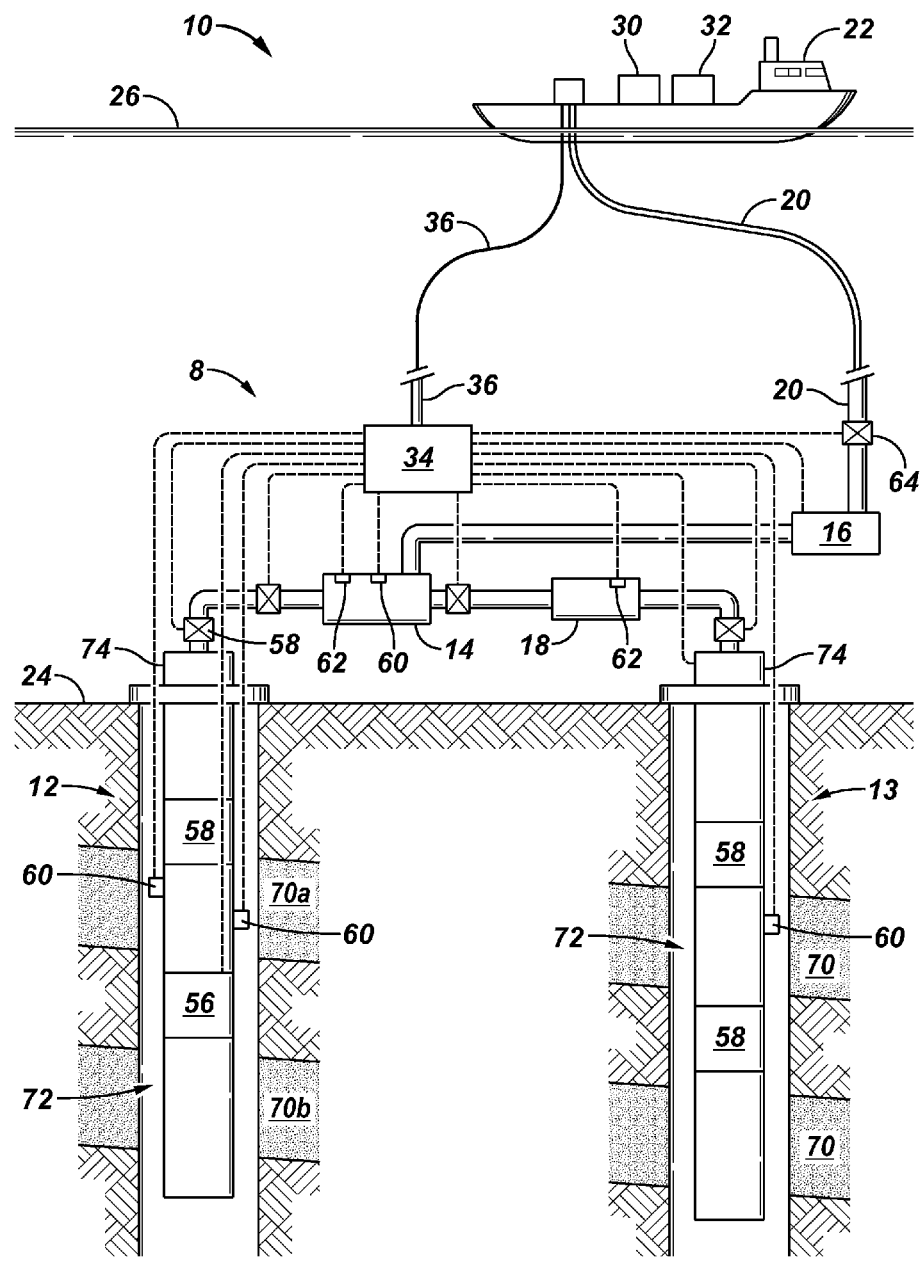
FIG. 3 is schematic view of another embodiment of an integrated power distribution system for a subsea production system.

FIG. 3 is schematic illustration of another embodiment of an integrated power distribution network 10 and subsea production system 8. FIG. 3 depicts a production well 12 and an injection well 13 each penetrating one or more subterranean formations, indentified generally as formation 70, and identified individually as formation 70a, formation 70b, etc. Each of the wells 12, 13 comprises a completion 72 disposed in the well and operationally connected to wellhead 74 (e.g., Christmas tree, valve tree, tree, etc.). Each completion 72 may include one or more operational devices (e.g., pumps, sensors, valves, etc.) that are operationally connected to power distribution hub 34 and surface host facility 22. For example, depicted production well 12 includes at least one sensor 60, in-well valve 58, and an electric submersible pump 56, each of which is operationally connected to host facility 22 through subsea distribution hub 34. As further described below, production well 12 can be monitored, powered, and controlled from surface host facility 22 (i.e., controller 32) through subsea power distribution hub 34.

With reference to FIGS. 1 to 3, surface host facility 22 is operationally connected via umbilical 36 to subsea power distribution hub 34 and operationally connected to various components of subsea production system 8 from subsea distribution hub 34 via jumpers 38. Umbilical 36 and jumpers 38 comprise power conductors 40 and/or data conductors 42 to operationally connect the various subsea production system 8 components. In the embodiment depicted in FIG. 3, electrical power and/or data communication is provided to subsea production system 8 components such as: in-well (i.e., subsurface, downhole) pumps 56 (e.g., lifting pumps, injection pumps, electric submersible pumps); seafloor pumps such as booster pump 16 and injection pump 18; valves 58 (e.g., chokes, in-well valves, flowline valves, tree valves, manifolds, etc.); sensors 60 (e.g., pressure, temperature, flow rate, fluid phase composition (i.e., oil, water, gas), scaling, electrical current, sand production detection, etc.); local instrumentation and control 62, and other subsea production system devices generally identified by the numeral 64 (e.g., flow line heater, chemical pumps, hydraulic pumps, etc.). It will be recognized by those skilled in the art with benefit of this disclosure that the operational subsea production system 8 components, such as for example processing units 14, pumps 56, 16, 18 can include sensors, and instrumentation and controls which are not illustrated individually or separately herein.

Control of the entire integrated power distribution network 10 and subsea production system 8 can by established via the surface power source 30 and surface controller 32 interface at surface host facility 22. Control signals can be transmitted via dedicated data conductors 42 in the high voltage supply umbilical 36 to subsea distribution hub 34 and for subsea distribution hub 34 to the various subsea production system components, for example in response to the closed feedback loop. High voltage electrical power (e.g., AC and/or DC power) can be transmitted over extensive step-out distances to subsea power distribution hub 34 wherein the high voltage electrical power is stepped down (i.e., transformers 50) and then transmitted to the electrical components of subsea production system 8 pursuant to the driving voltage requirements of the system components (e.g., medium voltage 44, low voltage 46, DC voltage 48). One or more circuits at subsea power distribution hub 34 can comprise a variable speed drive 52 facilitating operational control from surface controller 32 of subsea production system 8 components such as and without limitation, in-well pumps 56 and seafloor pumps 16, 18; and to provide power balancing.

High frequency streaming of input data to surface controller 32 from the subsea production system 8 components (e.g., sensors 60, local instrumentation and controls, etc.) enables real time subsea production system monitoring (i.e., surveillance) and responsive control of subsea production system 8 components for optimization of subsea production, and system integrity and protection. Priority can be given to process and emergency shutdown input signals from the surface host facility 22 for complete system safety. For example, embodiments of surface power supply 30 and surface control system 32 can be linked to surface host facility 22 emergency shutdown so that subsea production can be stopped in a safe and controlled manner by effecting well shut-in and pump systems stop sequences. Detailed subsea production system 8 wide power monitoring can allow power optimization at surface host facility 22 via load sharing between, for example, subsea pumping systems 58, 16, 18 and allow optimized starting and running of subsea pumps operating in series and of combinations of in-well 56 and seabed booster pumps 16. In addition, the inherent logic will allow the subsea production system 8 to be modeled via simulations, to assure optimized equipment operation.

Surface controller 32 provides, for example, load-balancing between two or more electric submersible pumping systems 56 deployed in one or more wells 12, 13 via variable speed drive(s) 52 and subsea distribution hub 34. Surface controller 32 can also be used to balance loads between in-well pumps 56 and seafloor booster pumps 16. When pumps in subsea production system 8 are connected in series, for example, there typically is an uneven distribution of load between pumps. Surface controller 32 can facilitate manual or automatic balancing, or selective mismatching, of the load on more than one pump 56, 16, 18. In other embodiments, surface controller 32 can be used to manage loads on pumps, such as in-well pumps 56, by controlling a valve 58 (e.g., choke), for example, located at wellhead 74 (e.g., tree) and/or production gathering manifold 15.

Surface controller 32 can be used to provide over-current protection or other electrical protection. Additionally, surface controller 32 may utilize subsea variable frequency drive 52, for example, to provide load control between electrical consumers, such as in-well and subsea pumps, via the active switching of the electrical power supply at subsea distribution hub 34. Production system parameters, e.g., flow rates, wellbore pressures, sand production, and the like can be effected from surface controller 32 in response to adjusting the power signal frequency supplied to one or more of the in-well pumps 56 and/or booster pumps 16. Similarly, various production parameters (e.g., phase fractions, flow rates, pressures, sand production, etc.) can be effected from surface controller 32 in response to adjustment of valves 58 (e.g., choking), processing units 14, and booster pumps 16.

Safety and system protection can be provided by a surface controller 32. For example, in response to data sensed from one or more subsea production system 8 components 12, 14, 16, 18, 56, 58, 60, 62, surface controller 32 can initiate responsive control actions in real time. For example, in response to input of a high pressure measurement in well 12, controller 32 can initiate the shut-in of production well 12 via stopping in-well pump 56 and closing one or more valves 58, for example subsurface safety valves, wellhead valves, and production manifold valves. In another example, in response to a high pressure measurement in production well 12, surface controller 32 can initiate actions that reduce the well pressure. For example, surface controller 32 can increase the speed, i.e. flow rate, of in-well pump 56, open one or more valves 58, and/or decrease the resonant time at processing units 14. In one example of a safety measure, upon initiation by surface controller 32 of a shutdown of in-well pump 56, surface controller 32 can prevent the closing of one or more valves 58 in response to data input from a sensor 60 indicative of continuing operation of the in-well pump 56. In another example, surface controller 32 can initiate an in-well pump 56 shutdown process in response to data input from a sensor 60 indicating excessive vibration of the in-well pump 56.

Subsea production can be controlled via operational control from surface host facility 22 and surface controller 32 of one or more subsea production system 8 components. For example, operating conditions of one or more subsea production system 8 components can be adjusted from surface controller 32 in response to input data measured (e.g., sensor 60, local instrumentation and control, etc.) in a production well 12. For example, upon receipt of input data (e.g., feedback loop data) from a sensor 60 disposed in production well 12 that sand production is increasing from formation zone 70b, sending output control signals from controller 32 may for example reduce the operating speed of in-well pump 56, and or actuate a valve 58, for example at wellhead 74 to increase the bottomhole pressure in production well 12, and/or actuate one or more in-well valves 58 to isolate formation zone 70a from other subterranean formations. In another example of operational control of subsea production system 8, operational parameters of subsea processing unit(s) 14 may be adjusted to optimize the subsea separation of phase compositions of the raw production fluid produced from production wells 12.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A subsea production system, comprising:
    a surface host facility comprising a surface electrical power source and a processor based surface controller;
    a subsea power distribution hub operationally connected to the surface electrical power source to receive a high AC voltage input, the subsea power distribution hub comprising a subsea transformer to step down the high AC voltage input from the surface electrical power source into a medium AC voltage subsea output and a low AC voltage subsea output, wherein the processor based surface controller is operationally connected to the subsea power distribution hub to transmit output data to the subsea power distribution hub and to receive input data from the subsea power distribution hub;
    an in-well pump disposed in a subsea well, the in-well pump being powered from one of the voltage subsea outputs of the subsea power distribution hub; and
    a seafloor booster pump being powered from one of the voltage subsea outputs of the subsea power distribution hub;
    wherein the processor based surface controller is configured to, in response to receiving input data from the subsea power distribution hub, initiate real-time monitoring and response control actions at the surface on the in-well pump.

2. The system of claim 1, wherein the surface host facility is operationally connected to the subsea power distribution hub by an umbilical comprising high voltage AC connectors and a data conductor.

3. The system of claim 1, wherein the surface electrical source is operationally connected to the subsea power distribution hub by an umbilical to transmit about 22,000 VAC or greater from the surface electrical source to the subsea power distribution hub.

4. The system of claim 3, wherein the medium AC voltage output is approximately 3,000 VAC to about 7,000 VAC.

5. The system of claim 3, wherein the low AC voltage output is approximately 110 VAC to about 700 VAC.

6. The system of claim 3, wherein the surface host facility is disposed about 10 km or more from the subsea power distribution hub.

7. The system of claim 3, wherein the surface host facility is disposed about 150 km from the subsea power distribution hub.

8. The system of claim 1, wherein the subsea power distribution hub comprises a variable speed drive operationally connected to at least one of the medium AC voltage subsea output and the low AC voltage subsea output.

9. The system of claim 8, wherein:
    the in-well pump is operationally connected to the subsea power distribution hub to receive output data from the subsea power distribution hub and to transmit input data to the subsea power distribution hub; and
    the seafloor booster pump is operationally connected to the subsea power distribution hub to receive output data from the subsea power distribution hub and to transmit input data to the subsea power distribution hub.

10. The system of claim 1, wherein the power distribution hub comprises a rectifier to provide a DC power output.

11. The system of claim 1, wherein:
    the surface host facility further comprises a processor based surface controller operationally connected to the subsea power distribution hub to transmit output data to the subsea power distribution system and to receive input data from the subsea power distribution system;
    the processor based surface controller and the surface electrical source are operationally connected to the subsea power distribution hub by an umbilical comprising a high voltage AC conductor and a data conductor;
    the umbilical transmits 22,000 VAC or greater from the surface electrical source to the subsea power distribution hub;
    the medium AC voltage output is approximately 3,000 VAC to about 7,000 VAC; and
    the low AC voltage output is approximately 110 VAC to about 700 VAC.

12. The system of claim 1 wherein the processor based surface controller is configured to, in response to receiving input data that indicates a high pressure measurement of the subsea well, initiate a shut-in procedure by transmitting control output data to stop the in-well pump and close one or more subsurface valves.

13. The system of claim 12 wherein prior to the processor based surface controller initiating the shut-in procedure, the processor based surface controller is configured to initiate actions to reduce the subsea well pressure by transmitting control output data to increase a speed of the in-well pump, open one or more subsurface valves in fluid communication with the subsea well, or decrease a resonant time at a subsea processing unit.

14. A method for providing electrical power to a subsea production system including a subsea production well, the method comprising:

supplying a high voltage AC input from a surface host facility comprising a processor based surface controller to a subsea power distribution hub located proximate to a seafloor;

stepping down the high AC voltage input at a subsea transformer within the subsea power distribution hub into a medium AC voltage subsea output and a low AC voltage subsea output;

supplying the medium AC voltage subsea output to power two or more medium voltage devices of a subsea production system; and supplying the low AC voltage subsea output to power one or more low voltage devices of the subsea production system;

receiving input data from a subsea sensor at the subsea power distribution hub; and initiating, by the processor based surface controller, in response to receiving the input data from the subsea power distribution hub, real-time monitoring and responsive control actions on an in-well pump disposed in the subsea production well.

15. The method of claim 14, wherein the two or more medium AC voltage devices comprise:

the in-well pump disposed in the subsea production well; and a seafloor booster pump in fluid connection with the in-well pump.

16. The method of claim 14, further comprising balancing electrical power distribution from the subsea transformer within the subsea power distribution hub to the two or more medium AC voltage devices.

17. The method of claim 16, wherein the balancing the electrical power distribution comprises supplying output data from the processor based surface controller at the surface host facility to the subsea power distribution hub.

18. The method of claim 14, wherein supplying high AC voltage electricity comprises supplying approximately 22,000 VAC or more to the subsea power distribution hub from the surface host facility located more than 10 km away from the subsea power distribution hub.

19. The method of claim 18, wherein:

the medium AC voltage output is approximately 3,000 VAC to about 7,000 VAC; and the low AC voltage output is approximately 110 VAC to about 700 VAC.

20. Integrated power distribution network devices for a subsea production system, comprising:

a surface host facility comprising a surface electrical power source and a processor based surface controller;

a subsea power distribution hub adapted to connect to the surface host facility to receive a high AC voltage input and to step down with a subsea transformer the high AC voltage input to a medium AC voltage subsea output and a low DC voltage subsea output, wherein the processor based surface controller is operationally connected to the subsea power distribution hub to transmit output data to the subsea power distribution hub and to receive input data from the subsea power distribution hub;

an umbilical adapted to operationally connect the subsea power distribution system to the surface host facility, the umbilical comprising an electrical conductor to transmit the high AC voltage input and a data conductor to transmit control output data from the surface host facility to the subsea distribution hub and input data from the subsea power distribution hub to the surface host facility;

a jumper adapted to operationally power an in-well pump with the medium AC voltage subsea output;

a jumper adapted to operationally power a seafloor booster pump with the medium AC voltage subsea output; and a jumper adapted to operationally power a sensor disposed in a subsea well with the low DC voltage subsea output;

wherein the processor based surface controller is configured to, in response to receiving input data from the subsea power distribution hub, initiate real-time monitoring and responsive control actions on the in-well pump via the subsea power distribution hub.

21. The integrated power distribution network devices of claim 20 wherein the processor based surface controller is configured to, in response to receiving input data that indicates a high pressure measurement of the subsea well, initiate a shut-in procedure by transmitting control output data to stop the in-well pump and close one or more subsurface valves.

* * * * *